United States Patent [19]

Järund

[11] 4,051,950
[45] Oct. 4, 1977

[54] HYGIENIC PROTECTIVE SHIELD

[75] Inventor: Harry Sigurd Valdemar Järund, Lund, Sweden

[73] Assignee: Jarund Devello AB, Fjallbacka, Sweden

[21] Appl. No.: 589,062

[22] Filed: June 23, 1975

[30] Foreign Application Priority Data

June 26, 1974 Sweden .............................. 7408416
Aug. 5, 1974 Sweden .............................. 7410017

[51] Int. Cl.² .......................................... B65D 85/38
[52] U.S. Cl. .................................. 206/306; 206/438; 206/484
[58] Field of Search ............... 128/DIG. 24; 206/306, 206/361, 362.4, 363, 370, 438, 440, 484, 491, 525, 527, 819–820; 229/3.5 R, 3.5 MF, 53, 55

[56] References Cited

U.S. PATENT DOCUMENTS

| | | |
|---|---|---|
| 3,446,632 | 5/1969 | Le Van .......................... 206/484 X |
| 3,552,558 | 1/1971 | Poncy ............................ 206/306 |
| 3,604,616 | 9/1971 | Greif ............................. 206/484 X |
| 3,752,309 | 8/1973 | Hopkins et al. ............... 206/306 |
| 3,809,228 | 5/1974 | Fowler et al. ................ 206/306 |
| 3,847,280 | 11/1974 | Poncy ............................ 206/306 |
| 3,899,077 | 8/1975 | Spiegelberg ................... 206/820 X |

Primary Examiner—Steven E. Lipman
Attorney, Agent, or Firm—Brumbaugh, Graves, Donohue, & Raymond

[57] ABSTRACT

A hygienic protective shield, as seat shield, protecting glove, shield for thermometers or other temperature sensing devices and shields for other instruments, which shield comprises two adjacent plastic foils, attached to each other to form a space for receiving and enclosing an object, at least two covering foils attached on each side of the two-layer plastic foils, and two stiffening plastic strips arranged to overlap th covering foils. The shield can be packed in sterile condition and remains sterile until the movement when used thereby avoiding contamination.

6 Claims, 5 Drawing Figures

HYGIENIC PROTECTIVE SHIELD

The present invention relates to a hygienic protective shield such as seat shields, protecting gloves, and shields for thermometers such as mouth thermometers or sensing means for electronic thermometers, a process for the manufacture of such shields and a device for carrying out the process.

The object of the present invention is to obtain a hygienic and bacteriological shield, such as a seat shield, protecting gloves, shields for thermometers and for sensing means for electronic thermometers, which shield can be packed sterilely and which remains sterile to the moment when used.

Shields for rectal thermometers are known. These shields consist of two plastic foils being welded into a shield which encloses a thermometer tightly. Such shields are also known which are removably attached on a paper foil to provide a simple package and simple manipulation of the shields in question. Such known shields will, however, not remain sterile on their outer surfaces as they are not completely enclosed.

Protecting gloves made of thin plastic foils are also known. Such gloves may also be attached to a single paper backing to make distribution easier. The drawback to such gloves is however, that they do not remain sterile after a sterilisation, as air borne bacteria can contact on one or more of the open surfaces.

This problem has now been solved in a simple and rational way by means of the present invention which is characterised in that the plastic foils are covered on each side with covering paper foils, which are removably attached to the plastic foils, to be removed immediately before use of the shield.

In a preferred embodiment of the hygienic shields the plastic foils at their open ends are each further provided with a stiffening plastic strip, which overlaps the paper foils covering the plastic foils.

According to another preferred embodiment of the hygienic shield according to the invention it consists of two rectangular plastic foils lying close to each other of which a shorter one has at least the same length as the object intended to be introduced between the foils, two rectangular paper foils which have a length which is shorter than the shortest plastic foil, and are arranged individually on each side of the plastic foils, to expose one end of the plastic foils and two plastic strips fixedly attached to the exposed end, of the two plastic foils, the plastic foils being sealed to each other along a heat sealing line forming a limited spaced intended to receive an object and the heat sealing being performed in such a way that the space is completely or partly cut off from the remaining parts of the plastic foils, the paper foils being removably attached to the plastic foils via the heat sealing, and the plastic strips overlapping the respective paper foil.

According to another preferred embodiment of the hygienic shield of the invention the paper foils and the plastic foils are attached to each other along a heat sealing line arranged close to the ends of said paper foils away from the plastic strips.

The hygienic shields are suitably arranged so that a number of hygienic shields are removably attached to each other by means of a perforation along the sides of the foils to the form of a band shields.

A further object of the invention is a process for preparing the above mentioned hygienic shields, whereby a paper foil track (each), two plastic foil tracks and a further paper foil track are brought together to a four layer track, which is introduced between a heat sealing jaw and a holder, whereupon the jaw is brought to lay close and to press against the four layer track to obtain a space intended to receive and enclose an object, whereupon the shield is completely or partly cut off from the material tracks.

A preferred embodiment of the process is characterised in that a heat sealing jaw is brought to lay close and to press against the material tracks along or close to its side away from the opening of the space intended to receive the object thereby to provide the seal.

Another preferred embodiment of the process is characterised in that two plastic strips are brought together with the four layer track along one side of the plastic foils so that they partly cover each paper foil track, whereupon each plastic strip is heat sealed to the plastic foil laying closest thereto.

A further preferred embodiment of the process is characterised in that the hygienic shields are completely or partly cut off from the material tracks as a rectangular unit.

Another object of the invention is a device for carrying out the process above, which device comprises at least four supply rolls arranged in two groups each comprising a plastic foil track and a paper foil track, a heat sealing means, and a cutting device. In a preferred embodiment two further supply rolls for plastic strips are provided as well as two heat sealing means for fixing of the respective plastic foil to the respective plastic strip.

The present invention will in the following be described more in detail with reference to the attached drawing wherein FIG. 1 shows a preferred embodiment of a hygienic shield of the invention seen from above.

Figure 1:
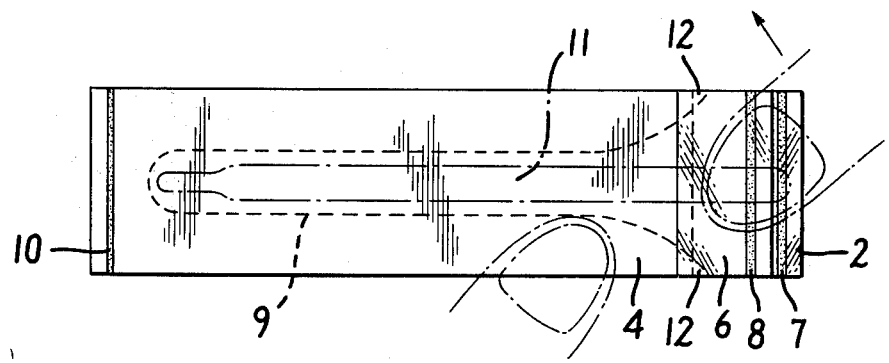
Figure 2:
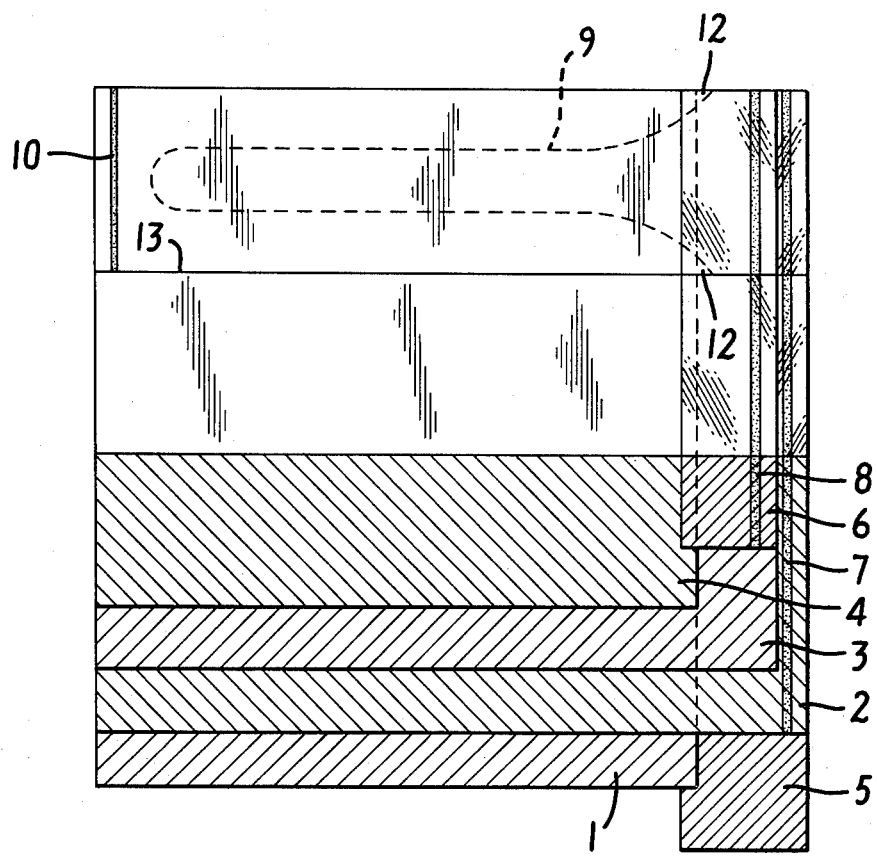
FIG. 2 shows in section, the different material tracks forming the hygienic shield in a combined form.
Figure 3:
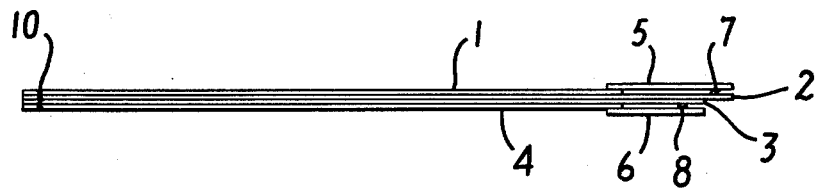
FIG. 3 shows the embodiment of FIG. 1 seen from the side
Figure 4:
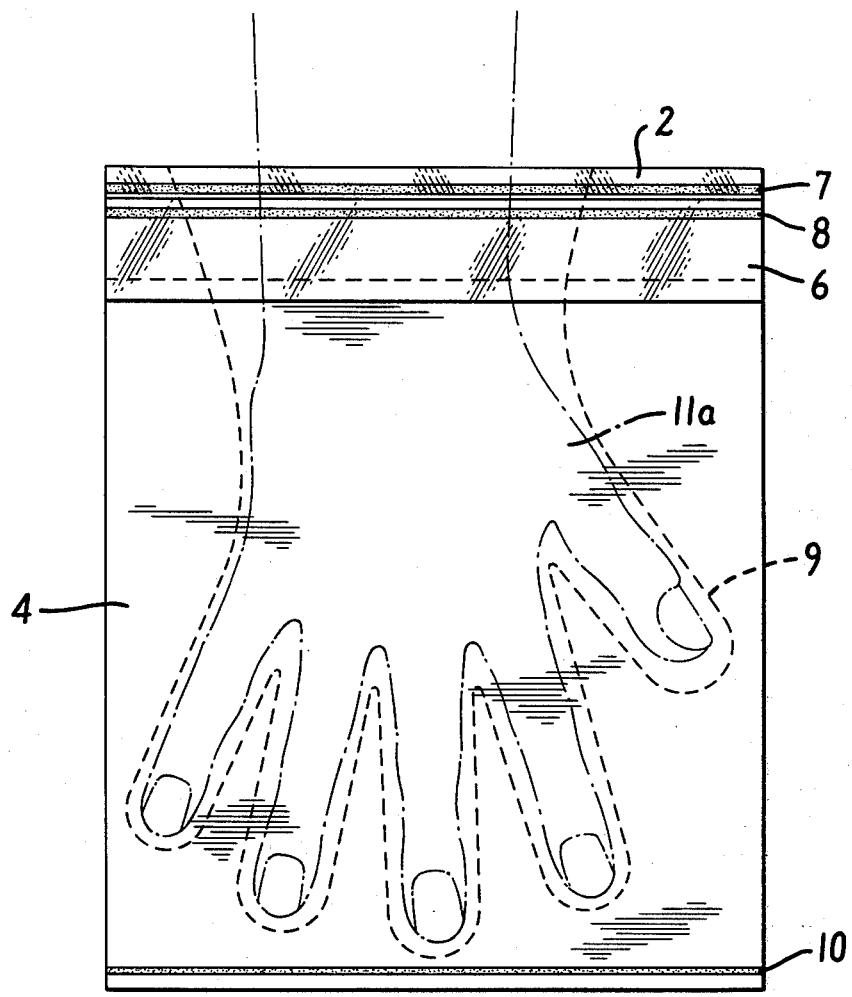
FIG. 4 shows another preferred embodiment of the invention
Figure 5:
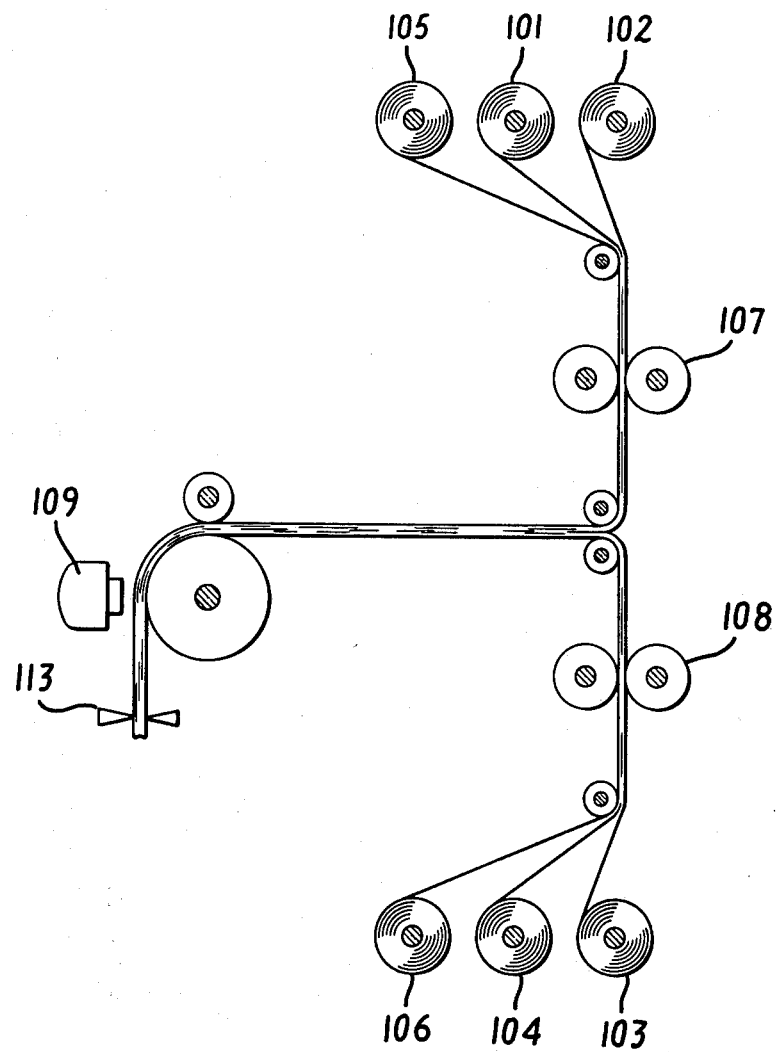
FIG. 5 shows a device for producing shields of the invention.

In FIGS. 1, 3 and 4 a preferred embodiment of the present invention is shown whereby 1 and 4 denote two paper foils, which are removably heat-sealed on each side of two plastic foils 2 and 3 lying close to each other and being made of e.g. polyethene which is transparent, flexible and elastic. The four foils are rectangularly designed, whereby the foil 2 is longer than the foil 3 and whereby this is longer than the paper foils 1 and 4, which are of the same length. The foils 1,2,3 and 4 start from the same end line. At the end of the plastic foils 2 and 3 which are not covered by the paper foils, plastic strips 5 and 6 are heatsealed to each plastic foil 2 and 3 along two heat sealing weldings 7 and 8, the plastic strips overlapping the paper foils 1 and 4. The paper foils 1 and 4 are as mentioned above, removably heat sealed to the plastic foils 2 and 3 along a line 9, which limits an oblong rounded surface which widens at one side. In FIG. 1 it is oblong, in FIG. 4 is has the shape of a hand. The heat sealing is carried out in such a way that the plastic foils are melted together whereby an oblong space is obtained opening towards one side and intended to receive and enclose a sensitivity means II introduced therein, at the same time as the plastic foils have been cut off completely or partly from the parts lying outside. At the end remote from the opening all foils are attached to each other along a head welding 10.

In order to increase the degree of stiffening at the open end of the space and/or a collar of a glove, the plastic strips 5 and 6 are made of a thicker quality than the plastic foils 2 and 3 and the heat sealing 9 is extended in such a way that a heat sealing of the plastic foils 2 and 3 is made with the plastic strip 5 and 6 in two points 12 situated in each inner corner of the plastic strips 5 and 6.

In the use of the hygienic shield a sensing means 11 or a hand 11a (FIG.4) is introduced between the plastic strips 5 and 6 and into the space which is limited by the heat sealing 9. Thereupon a grip is made with the fore finger and thumb of the one hand over the plastic strips and the top of the sensing means and with the forefinger and thumb of the other hand outside the heatsealing 9 as indicated in FIG. 1. The hand holding the sensing means is then brought sidewise outwardly - upwardly as indicated with an arrow whereby the shield is set free from the paper foils and the remaining parts of the plastic foils. Up to this moment the shield has been completely protected inside the paper foils and the overlapping of the plastic strips.

The manufacture of the hygienic shield can be done in a simple and rational way in accordance with the following.

A plastic strip track 5, a paper foil track 1 and a plastic foil track 2 are brought together from their respective supply rolls in such a way that the plastic foil 2 and the plastic strip 5 run with common side on the one side and the plastic foil 2 and the paper foil 1 run with common side on the other side of the plastic foil. The tracks thus brought together are introduced between heating jaws or corresponding means, where upon a heat sealing of the plastic foil and the plastic strip together is made.

In the same way a plastic strip track 6, a paper foil track 4 and a plastic foil track 3 are brought together from supply rolls and the plastic strip 6 and the plastic foil 3 are welded together. The two sets of material tracks are then brought together in such a way that the plastic foils will lie close to each other.

The collected material tracks are then introduced under a heat sealing jaw, which is brought to lay close and to press against the material tracks, the plastic foils being welded together along the line 9. The welding together is thereby carried out in such a way that the parts of the plastic foils situated outside the line 9 are cut off from the material inside the line. At the welding together the paper foil will be fastened to the plastic foils by means of a certain melting of plastic material into the paper. This fixation is however not stronger than the plastic foil, which may relatively easily be separated from the paper.

Simultaneously with the applying of the heat sealing 9 an application of a further heat welding 10 is made by a further heating surface which is brought to lay close and to press against the material tracks close to their common side. The heating jaw thereby applied is provided with two surfaces or edges which transfer the heat. Hereby a welding of the materials together is carried out to have the paper foils 1, 4 not to flap up from the plastic foils 2, 3. The welding together is followed by a cutting off of the shaped shield to a rectangular unit along the line 13, or a perforation along the same line 13 whereby in the latter case the hygienic shields are rolled together and packed in a dispensing package.

In the above given embodiment of the hygienic shield the plastic strips 5 and 6 stiffening the entrance opening for the sensing means have been included. These may however, be omitted if so desired whereby, however, the degree of protection of the outside of the hygienic shield before use is reduced to some extent.

A suitable device for manufacture of hygienic shields of the invention comprises in total six supply rolls 101, 102, 103, 104, 105 and 106 of material organized in two groups of three for bringing together of two three-layer tracks 101, 102, and 105, and 103, 104 and 106, respectively, and thereupon one six layer track. The device further comprises one heat sealing jaw 107, 108 arranged with each three layer track to obtain the sealings 7 and 8. Further, the device comprises a sealing station 109 for producing the heat sealing 9 and the sealing 10, and a cutting off or perforation station 113 for separating the hygienic shields completely or partly.

The term heat sealing above is to be understood to cover any type of heat seaing used in the plastic technique such as direct heat micro-wave heating or pulse heating.

I claim:
1. An hygienic protecting shield for an object, such as a seat shield, a protecting glove, a shield for a thermometer or other temperature sensing devices, and a shield for other instruments, which shield comprises:
   two adjacent plastic foils at least one of which is at least the same length as the part of the object to be received in the shield;
   at least one covering foil arranged on the outside of each of the two plastic foils to form at least four foil layers, the covering foils being shorter than the plastic foils and further arranged thereon to expose one end of the plastic foils;
   means removably attaching each covering foil to the adjacent plastic foil and sealing the plastic foils to each other along a line defining an object-receiving space between the plastic foils which is a least partly cut off from the remaining parts of the plastic foils and has an opening for receiving the object at the exposed end of the plastic foils, the attaching and sealing means being spaced inwardly from at least a portion of an edge of the foils which is sufficiently close to the exposed end of the plastic foils and adapted in combination with the covering foils for facilitating a sidewise tearing of the object-receiving part of the plastic foils from the covering foils and the remainder of the plastic foils; and
   a stiffening strip on the exposed end of each plastic foil which overlaps the corresponding covering foil, whereby the object-receiving part of the plastic foils is covered with the covering foils and stiffening strips until the shield is used to prevent contamination thereof and, for use, the object can be inserted between the stiffening strips into the object-receiving space between the plastic foils and the stiffening strip and the end portion of the shield then grasped and easily separated to provide an hygienic foil shield about the object.

2. Hygienic shield according to claim 1 characterized in that a number of hygienic shields are removably attached to each other by means of a perforation (13) along sides of the foils to form a band of shields.

3. An hygienic shield according to claim 1 further characterized in that one plastic foil is shorter than the other at the exposed end of the plastic foils and the covering foils are shorter than the shorter of the plastic foils to expose an end of both plastic foils.

4. An hygienic shield according to claim 1 further characterized by means for sealing the covering and the plastic foils to each other outside the object-receiving space and at an end opposite the exposed end of the plastic foils.

5. An hygienic shield as in claim 1 further characterized in that the stiffening strips are fixed on the respective plastic foils only at edges of the foils and stiffening strips.

6. An hygienic protecting shield for a thermometer, the shield comprising:

two adjacent plastic foils at least as long as the part of the thermometer to be received in the shield;

a covering paper foil arranged on the outside of each of the two plastic foils to form four foil layers, the paper covering foils being shorter than the plastic foils and further arranged thereon to expose one end of the plastic foils;

a heat seal removably attaching each paper covering foil to the adjacent plastic foil and sealing the plastic foils to each other along a line for defining an object-receiving space between the plastic foils which is completely cut off from the remaining parts of the plastic foils and has an opening thereto for receiving the thermometer at the exposed end of the plastic foils, the heat seal line being spaced inwardly from a substantial portion of an edge of the foils adjacent the exposed end of the plastic foils to facilitate, in combination with the covering paper foils, sidewise tearing of the object-receiving part of the plastic foils from the paper covering foils and the remainder of the plastic foils; and a plastic stiffening strip on the exposed end of each plastic foils which overlaps the corresponding paper covering foil to prevent, in combination with the paper covering foils, contamination of the plastic foils until the thermometer is inserted in the object-receiving space and the shield torn from the remainder of the foils.

* * * * *

UNITED STATES PATENT OFFICE
CERTIFICATE OF CORRECTION

Patent No. 4,051,950   Dated October 4, 1977

Inventor(s) Harry Sigurd Valdemar Jarund

It is certified that error appears in the above-identified patent and that said Letters Patent are hereby corrected as shown below:

First page, line 8 of the Abstract, "th" should be --the--;
line 10 of the Abstract, "movement" should be --moment--;
Col. 1, line 29, "contact on" should read --easily contact--
line 47, after "foils" delete the comma;
line 48, after "foils" insert a comma;
line 49, after "end" delete the comma;
line 66, "the form of a band" should be --form a band of--;
Col. 2, line 1, "(each)" should read --(web)--;
line 66, "opening" should read --opened--;
Col. 3, line 3, "head" should read --heat--;
line 35, "where upon" should read --whereupon--;
Col. 4, line 20, "seaing" should read --sealing--; and
line 40, "a least" should read --at least--.

Signed and Sealed this

Fourth Day of April 1978

[SEAL]

Attest:

RUTH C. MASON
Attesting Officer

LUTRELLE F. PARKER
Acting Commissioner of Patents and Trademarks